(12) United States Patent
Hosoki

(10) Patent No.: US 6,232,431 B1
(45) Date of Patent: May 15, 2001

(54) ANAEROBICALLY HARDENABLE SEALING COMPOUND COMPOSITION

(75) Inventor: Satoshi Hosoki, Tokyo (JP)

(73) Assignee: Three Bond Co., Ltd., Tokyo (JP)

( * ) Notice: Subject to any disclaimer, the term of this patent is extended or adjusted under 35 U.S.C. 154(b) by 0 days.

(21) Appl. No.: 09/367,628

(22) PCT Filed: Feb. 20, 1998

(86) PCT No.: PCT/JP98/00701

§ 371 Date: Aug. 19, 1999

§ 102(e) Date: Aug. 19, 1999

(87) PCT Pub. No.: WO98/37161

PCT Pub. Date: Aug. 27, 1998

(30) Foreign Application Priority Data

Feb. 20, 1997 (JP) .................................................. 9-076434

(51) Int. Cl.⁷ ...................................................... C08G 64/00

(52) U.S. Cl. .............................................................. 528/196

(58) Field of Search .................................................. 525/64

Primary Examiner—Terressa M. Boykin
(74) Attorney, Agent, or Firm—Dilsworth & Barrese, LLP

(57) ABSTRACT

An anaerobic curable sealant composition is disclosed which is suitable as a fluid gasket for use in portions to be sealed in the field of automobile parts for example and which is superior in oil resistance and flexibility, the flexibility being retained even in a high-temperature atmosphere.

The composition is prepared by adding core-shell fine particles consisting of a core of a rubbery polymer and a shell of a glassy polymer to an anaerobic curable sealant comprising a urethane (meth)acrylate prepolymer, a radical-polymerizable monomer and an organic peroxide. It has a repulsive force high enough to retain flexibility and sealability capable of coping with vibrations and external stresses induced in a seal portion and is superior in oily surface adhesion.

6 Claims, No Drawings

ANAEROBICALLY HARDENABLE SEALING COMPOUND COMPOSITION

FIELD OF THE INVENTION

The present invention relates to an anaerobic curable sealant composition and more particularly to an anaerobic curable sealant composition useful as a fluid gasket for forming a seal between two surfaces of flanges which are large in the amount of displacement. The anaerobic curable sealant composition of the present invention is employable usefully especially as a fluid gasket for preventing the leakage of a lubricating oil in various industrial machines and devices such as internal combustion engines and drive units.

PRIOR ART

Heretofore, in the fields of automobile parts, electric parts and various mechanical parts, as a method for bonding and sealing components to be sealed on an assembly line there has been adopted a method wherein sealing surfaces are pressure-welded through a molded gasket or a method wherein sealing surfaces are sealed through a fluid gasket. Particularly, as to the latter method using a fluid gasket, an FIPG (Formed In Place Gaskets) method, in which sealing surfaces are sealed under automatic application of a liquid sealant using a robot or the like on an assembly line, is most popular because of high productivity, low cost and highly reliable sealing performance. As an FIPG there mainly is used an anaerobic gasket containing as main components a room temperature curing type silicone material (silicone RTV) which reacts with moisture contained in the air and cures and a urethane (meth)acrylate which cures in a short time upon contact with metallic surfaces after shutting out oxygen by sandwiching a sealant in between flange surfaces. Particularly, silicone RTV is presently in use most widely because of its high heat resistance and excellent workability and adaptability to coated flange surfaces.

In the FIPG using silicone RTV, however, with upgrading of various oils, including engine oil, the damage to silicone rubber caused by oils has been becoming more and more serious and the attainment of a high resistance to oil is now a problem to be solved.

Particularly, as to oils used in automobiles or the like, an acrylic anaerobic curable sealant has come to be used. This sealant, because of an acrylic type, involves the drawback that it is poor in flexibility as compared with silicone compositions. The sealant is required to possess flexibility sufficient to cope with vibrations and stresses in a sealing portion including flanges or the like and also possess a repulsive force sufficient to retain sealability. It is difficult to consider that the acrylic anaerobic curable sealant satisfies these characteristics required. Thus, this sealant is unsatisfactory in actual use, and it is the actual situation that silicone RTV is used in most applications.

The flange of an oil pan is in many cases formed by combining different materials such as iron and aluminum. Therefore, a large lateral displacement is apt to occur at the flange surface due to a difference in thermal expansion coefficient between both materials which is caused by a change in temperature of the engine portion. The sealant layer is required to exhibit a high follow-up performance for coping with such displacement. This problem is serious especially in large-sized engines. The lateral displacement of the flange surface can be diminished by increasing the thickness of the gasket, but this attempt gives rise to an extremely serious drawback that an anaerobic curing does not take place.

In view of this point, methods have been proposed to impart flexibility to an anaerobic curable polymeric composition as an acrylic composition, such as a method of imparting flexibility to the composition itself by using an urethane acrylate as acryl material and a high molecular prepolymer prepared by polymerizing a monomer which is a soft segment of, say, a polyether in the main chain, and a method of imparting flexibility to the entire composition by adding a plasticizer or synthetic rubber particles such as acryl rubber or butyl rubber particles to an acryl polymerizable compound.

However, in the case of using a soft segment-containing high-molecular prepolymer, the flexibility of the composition is deteriorated when the composition is used in an atmosphere held at 120° C. or so, that is, when subjected to heat history. At a portion which becomes high in temperature the flexibility of sealant is lost with the lapse of time. In the synthetic rubber particles-added type, although flexibility is retained, there occurs a marked deterioration of solubility during production, thus requiring a long time in the manufacturing process. Moreover, if the sealant is stored in a liquid state, the rubber particles may be precipitated or agglomerated and clogged in the nozzle of an applicator. The use of a plasticizer gives rise to the drawback that the plasticizer oozes out from the sealant after curing.

In the conventional anaerobic curable fluid gasket, if engine oil, auto transmission fluid, or gear oil, is adhered to sealant bonding surfaces, there occurs a marked deterioration of bonding force. Usually, a mold release agent or an abrasive oil is adhered to the bonding surfaces and therefore it is necessary to perform degreasing and washing with use of an organic solvent or a detergent.

An anaerobic curable sealant composition is applied in an appropriate amount to sealing surfaces of flanges or the like, and when the sealing surfaces are clamped, an oxygen-shut out portion polymerizes and cures to form a seal layer. However, when the amount of the composition to be applied cannot be controlled precisely or when it is used in an excess amount for attaining a reliable sealing performance, the composition may be forced out from the flange surfaces. The thus-exposed portion of the anaerobic curable sealant composition, which portion is in contact with air, does not cure. Therefore, it is necessary that the composition should possess a property not exerting a bad influence on the surrounding materials.

Particularly when the anaerobic sealant composition is used in the engine and transmission of an automobile or the like, it is required in practical use that the composition exposed from the flange bonding surfaces and before curing should have a property of being dispersed uniformly in the oils used. The anaerobic curable composition containing synthetic rubber particles as a flexibility imparting agent is deficient in such dispersibility.

OBJECTS OF THE INVENTION

It is an object of the present invention to solve the above-mentioned problems of the prior art and provide an anaerobic curable sealant composition superior in all of oil resistance, flexibility and sealability and capable of retaining excellent felxibility even after subjected to heat history.

SUMMARY OF THE INVENTION

The present invention resides in an anaerobic curable sealant composition comprising an urethane (meth)acrylate prepolymer, a radical polymerizable monomer, an organic peroxide, and core-shell fine particles comprising a core of a rubbery polymer and a shell of a glassy polymer.

DETAILED DESCRIPTION OF THE INVENTION

An anaerobic curable sealant composition comprising an urethane (meth)acrylate prepolymer, a radical-polymerizable monomer and an organic peroxide is already publicly known. The present invention is characterized by adding specific fine particles to the said composition to improve the performance of the composition.

The urethane (meth)acrylate used in the present invention is a prepolymer having a urethane structure in its main chain and having (meth)acryloyloxy groups at its ends. This prepolymer is prepared by reacting a compound having two or more hydroxyl groups as functional groups with an organic compound having two or more isocyanate groups as functional groups to prepare a polyurethane prepolymer and introducing (meth)acryloyloxy groups into its molecular ends.

For example, the prepolymer in question is obtained by reacting a urethane prepolymer, which results from mixing and reacting a polyether polyol and an organic diisocyanate at a molar ratio in the range from 1:1 to 1:2 in a diluting solvent, with a (meth)acryl monomer having active hydrogen in an amount sufficient to react with all of the remaining isocyanate groups in the said urethane prepolymer. The urethane (meth)acrylate prepolymer may be used alone, or two or more such prepolymers may be mixed together and used. By the term "(meth)acrylate" is meant acrylate or methacrylate, and by the term "(meth)acryloyloxy group" is meant acryloyloxy group or methacryloyloxy group. The term "oligomer" represents a dimer or a multimer having two or more urethane bonds, including a polymer.

As to the molecular weight of the urethane (meth)acrylate prepolymer, the molecular weight of the resulting prepolymer can be selected freely, for example, by adjusting the molecular weight of a compound having two or more hydroxyl groups as functional groups such as a polyether polyol or by adjusting the degree of reaction between a compound having two or more hydroxyl groups as functional groups and a compound having two or more isocyanate groups as functional groups. Usually prepared is a prepolymer of dimer to hectomer in terms of the degree of polymerization.

As the urethane (meth)acrylate prepolymer there may be used a publicly known one, as noted previously.

As the organic compound having two or more hydroxyl groups as functional groups for used in preparing the urethane prepolymer there may be used any of various aliphatic polyols and aromatic polyols. Examples are ethylene glycol, 1,2-propylene glycol, 1,3-butanediol, 1,4-butanediol, diethylene glycol, triethylene glycol, 1,6-hexanediol, neopentyl glycol, trimethylolpropane, glycerin, pentaerythritol, 1,2,6-hexanetriol, hydroxylated biphenol A, polyether polyol, and polyester polyol, with α, ω-diols being particularly preferred.

As the compound having two or more isocyanate groups as functional groups, which is the other component for use in preparing the urethane prepolymer, there may be used any of various aliphatic polyisocyanates and aromatic polyisocyanates. Examples are diphenylmethane diisocyanate, tolylene diisocyanate, naphthalene diisocyanate, xylene diisocyanate, and hexamethylene diisocyanate. Diisocyanates are particularly preferred.

In the reaction of the compound having two or more hydroxyl groups as functional groups with the compund having two or more isocyanate groups as functional groups, both compounds are used in such a manner that the isocyanate groups of the latter compound are in a proportion of equimolar amount or more, i.e., NCO/OH≧1, preferably 1~2, more preferably 1.1~1.7, relative to the hydroxyl groups of the former compound. It is particularly preferred that isocyanate groups be present at both ends of the urethane prepolymer.

Also as to the (meth)acryl monomer having active hydrogen for use in the reaction with the thus-prepared urethane prepolymer having isocyanate groups at both ends thereof, there may be used a known one. As examples of active hydrogen sources are mentioned hydroxyl group, amino group, carboxyl group, and mercapto group. More concrete examples include hydroxyl-containing (meth)acrylates such as hydroxyalkyl(meth)acrylate, mercapto-containing (meth)acryaltes such as mercaptoalkyl(meth)acrylate, and (meth)acrylic acid. As alkyl groups are preferred those having 1 to 6 carbon atoms. The thus-exemplified (meth)acryl monomer having active hydrogen is used in an amount sufficient to react stoichiometrically with the isocyanate groups in the urethane polymer molecules.

The radical polymerizable monomer used in the present invention may also be a known one. Usually employed is a radical-polymerizable monomer having one polymerizable unsaturated bond. Particularly preferred is a substituted or unsubstituted alkyl (meth)acrylate such as, for example, a (substituted) alkyl (meth)acrylate wherein the alkyl moiety has 1 to 18 carbon atoms. Exampes are ethyl (meth)acrylate, n-propyl (meth)acrylate, isopropyl (meth)acrylate, isobutyl (meth)acrylate, t-butyl (meth)acrylate, n-hexyl (meth)acrylate, 2-ethylhexyl (meth)acrylate, n-octyl (meth)acrylate, isooctyl (meth)acrylate, isononyl (meth)acrylate, n-decyl (meth)acrylate, isodecyl (meth)acrylate, n-lauryl (meth)acrylate, 2-methoxyethyl (meth)acrylate, 2-ethoxyethyl (meth)acrylate, 2-phenoxyethyl (meth)acrylate, stearyl (meth)acrylate, tridecyl (meth)acrylate, 3-methoxypropyl (meth)acrylate, 3,3-methoxymethylpropyl (meth)acrylate, 2-hydroxyethyl (meth)acrylate, and hydroxypropyl (meth) acrylate. These radical-polymerizable monomers may be used each alone or as a mixture of two or more.

The radical-polymerizable monomer is used in an amount of usually 1 to 50 parts by weight, preferably 5 to 30 parts by weight, based on 100 parts by weight of the urethane (meth)acrylate prepolymer.

The core-shell fine particles used in the present invention are characterized in that the core portion is constituted by a rubbery polymer and the shell portion by a glassy polymer. The particles have "elasticity" in the core portion and "hardness" in the shell portion and do not dissolve in a liquid resin. The polymer which constitutes the "core" substantially has a glass transision temperature below the ambient temperature, while the polymer which constitutes the "shell" substantially has a glass transition temperature above the ambient temperature. The range of the ambient temperature is established as a temperature range in which the sealant is used.

According to a preferred method for producing the fine particles used in the present invention, first the core portion is produced by polymerizing a polymerizable monomer. As the polymerizable monomer there may be used a known monomer insofar as the monomer affords a rubbery polymer. Examples are (meth)acrylate monomers such as n-propyl (meth)acrylate, n-butyl (meth)acrylate, 2-ethylhexyl (meth)acrylate, and n-decyl (meth)acrylate, aromatic vinyl compounds such as styrene, vinyltoluene, and α-methylstyrene, vinyl cyanide compounds such as acrylonitrile and methacrylonitrile, as well as monomers having one polymerizable unsaturated bond such as vinylidene cyanide, 2-hydroxyethyl (meth)acrylate, 3-hydroxybutyl (meth)acrylate, 2-hydroxyethyl fumarate, hydroxybutyl vinyl ether, monobutyl maleate, and butoxyethyl methacrylate. As further examples are mentioned ethylene glycol di(meth)acrylate, butylene glycol di(meth)acrylate, trimethylolpropane di(meth)acrylate, trimethylolpropane tri(meth)acrylate, hexanediol di(meth)acrylate, hexanediol tri(meth)acrylate, oligoethylene di(meth)acrylate, oligoethylene tri(meth)acrylate, aromatic divinyl monomers such as divinylbenzene, and crosslinkable monomers having two or more polymerizable unsaturated groups such as triallyl trimellitate and triallyl isocyanate. These polymerizable monomers may be used each alone or as a mixture of two or more insofar as they afford rubbery polymers. But the latter crosslinkable monomers are usually employed in combination with the former compounds.

Rubber properties vary depending on the molecular weight, molecular shape and crosslink density of the polymer prepared by polymerizing any of the polymerizable monomers exemplified above. In the present invention it is required that the core portion be constituted by a polymer which is rubbery at room temperature. It is more preferable that the resulting polymer has a glass transition point of below $-10°$ C.

Next, in the presence of the thus-prepared polymer particles as a core, there is performed a second polymerization involving polymerizing a polymerizable monomer to form a shell of a polymer which possesses glassy properties at room temperature. This polymerizable monomer may be selected from those exemplified previously as core forming monomers, provided it is required in the present invention that the polymer which constitutes the shell portion be glassy at room temperature. Preferably, the resulting polymer has a glass transition point of above $70°$ C. This can be determined taking into account the molecular weight, molecular shape and crosslink density of the polymer obtained by polymerizing the selected polymerizable monomer. If the polymer which constitutes the shell portion is not glassy at room temperature, then when the polymer particles are mixed into the radical-polymerizable liquid resin to prepare a sealant composition, the particles will be swollen by the radical polymerizable monomer, and with the lapse of time during storage, its viscosity will increase to form gels. That is, the storage stability will become low.

As preferred examples of the polymerizable monomer for forming the shell portion there are mentioned alkyl (meth)acrylates wherein the alkyl moiety has 1 to 4 carbon atoms, such as ethyl (meth)acrylate, n-butyl acrylate, methyl methacrylate, and butyl methacrylate. These (meth)acrylates may be used each alone or in combination of two or more. Among them, methyl methacrylate is particularly preferred.

The amount of the core-shell fine particles is 0.1 to 80 parts by weight, preferably 5 to 65 parts by weight, based on the total amount of 100 parts by weight of the urethane (meth)acrylate oligomer and the radical-polymerizable monomer. If the amount thereof is smaller than 0.1 part by weight, it will be difficult to let the sealant composition exhibit excellent flexibility when cured, and an amount thereof exceeding 80 parts by weight will lead to an extreme increase of viscosity and deterioration of the storage stability. Particularly preferred is an amount in the range of 10 to 40 parts by weight.

By the term "anaerobic" is meant a property which dislikes air, more particularly, a property such that stability and liquid state are retained in the presence of air or oxygen, but in the absence of air or oxygen there starts polymerization immediately. Anaerobic sealants have heretofore been used for bonding and sealing metallic part and for preventing looseness and fixing portions which are fitted together, and are thus publicly known. It is also publicly known that an anaerobic curable composition comprises a radical-polymerizable monomer such as a (meth)acrylate, a prepolymer thereof, a polymerization initiator such as an organic peroxide, a curing accelerator, and a polymerization inhibitor. Suitable such known components, including an organic peroxide, may be used in the present invention.

As examples of organic peroxides are mentioned such hydroperoxides as cumene hydroperoxide, t-butyl hydroperoxide, and diisopropylbenzene hydroperoxide, as well as diacyl peroxides, dialkyl peroxides, ketone peroxides, and peroxy esters, with cumene hydroperoxide being particularly preferred in point of stability and curing speed.

The amount of the organic peroxide to be used cannot be limited because it depends on the balance among the kind of the peroxide used, curing time and storage period, but is usually in the range of 0.01 to 10 parts by weight, preferably 0.1 to 5 parts by weight, based on the total amount of 100 parts by weight of the urethane (meth)acrylate and the radical-polymerizable monomer.

In order for anaerobic curing to take place effectively, it is desirable to add a curing accelerator in addition to the organic peroxide. Examples of curing accelerators include organic sulfone imides, amines, and organometallic salts. As organic sulfone imides, o-benzoic sulfimides are preferred. As amines, diethylamine, triethylamine, N,N-dimethylparatoluidine, and 1,2,3,4-tetrahydroquinone are preferred. As examples of organometallic salts are mentioned copper chloride and copper octylate. Where required, there may be added accelerators such as secondary and tertiary amines, stabilizers such as benzoquinone, hydroquinone, and hydroquinone monomethyl ether, polymerization inhibitors such as phenols, and chelate compounds such as ethylenediaminetetraactic acid (EDTA), sodium salts thereof, oxalic acid, acetylacetone, and o-aminophenols.

In the case where the flange material is an inert material such as a plastic material or where oxygen is present due to a large clearance, making anarobic curing difficult, it is recommended to apply a curing accelerating primer beforehand to the flange surfaces to be bonded, the curing accelerating primer containing a reducing agent for accelerating the decomposition of the organic peroxide to form radicals, whereby curing can be allowed to take place in a short time.

As the curing accelerating primer which contains a reducing agent for accelerating the decomposition of the organic peroxide to form radicals, it is desirable to use a primer which contains a condensate of an aldehyde compound and a primary or secondary amine and/or an oxidizable transition metal-containing compound. As examples of such condensate are mentioned butylaldehyde-butylamine condensate, butylaldehyde-aniline condensate, and acrolein-aniline condensate.

As examples of the oxidizable transition metal-containing compound are mentioned organic compounds containing a transition metal selected from the group consisting of iron, cobalt, nickel and manganese, with metal chelates and complex salts being particularly useful. More concrete examples are pentadione iron, pentadione cobalt, pentadione copper, propylenediamine copper, ethylenediamine copper, iron naphthenate, nickel naphthenate, cobalt naphthenate, copper naphthenate, copper octenoate, iron hexoate, iron propionate, and acetylacetone vanadium. Substituted thioureas such as ethylenethiourea and benzothiazole are also employable. For preparing the primer, it is preferable that the above reducing compounds be dissolved in a proportion of 0.05 to 10 wt % in such organic solvents as toluene, acetone, methyl ethyl ketone, and alcohols.

Into the sealant composition of the present invention there may be added, if necessary, various fillers such as fumed silica for the adjustment of viscosity, plasticizers, adhesion imparting agents such as silane compounds and phosphoric esters, and various known (meth)acrylic ester monomers for the adjustment of rubber strength, including hardness and elongation, such as isoborny (meth)acrylate, 2-hydroxyethyl (meth)acrylate, and 2-hydroxypropyl (meth)acrylate.

In the anaerobic curable composition of the present invention, since fine core-shell particles are added as a functional filler to the combination of the urethane (meth)acrylate prepolymer and the radical-polymerizable monomer, the flexibility of the composition does not deteriorate so markedly even under heat history, and the core-shell fine particles can be dispersed easily in the composition. Since the core-shell fine particles have an oil absorbing property, the bonding force of the composition is not deteriorated even on a surface with oil or the like adhered thereto. The anaerobic curable composition before curing, which contains the core-shell fine particles, is dispersed easily in oil.

EXAMPLES

For easier understanding of the present invention, the invention will be described in detail hereinunder by way of Examples thereof, which, however, do not restrict the scope of claim.

Preparing Sealant Compositions 1~6

An urethane (meth)acrylate prepolymer UN-1101T (a product of Negami Kogyo Co.) having a polyether in the main chain thereof, an urethane (meth)acrylate prepolymer UN-2500 (a product of Negami Kogyo Co.) having a polyester in the main chain thereof, and an epoxy acrylate SP-1507 (a product of Showa Kobunshi Co.), as urethane (meth)acrylate prepolymers, phenoxyethyl acrylate as a radical-polymerizable monomer, cumene hydroperoxide as an organic peroxide, ethylenediaminetetraacetic acid (EDTA) and butylhydroxytoluene (BHT) as stabilizers, saccharin, benzothiazole, n-dodecylmercaptan, and DAROCUR 1173 (a product of Ciba Geigy Co.), as accelerators, silica as a filler, and F-351 (a product of Nippon Zeon Co.) and STAPHYLOID IM-101 (a product of Takeda Chemical Industries, Ltd.) as core-shell fine particles comprising a core of a rubbery polymer and a shell of a glassy polymer, were used at such weight ratios as shown in Table 1 to prepare compositions 1 to 6.

Preparing Sealant Compositions 7~12 for comparison

Compositions 7 to 12 were prepared at such weight ratios as shown in Table 2, using the compounds used in the above preparation of compositions 1 to 6, provided some of them did not use the core-shell fine particles used in the above preparation of compositions 1 to 6, but instead used ethylene-acryl rubber fine particles, liquid butadiene-acrylonitrile, and bis-2-ethylhexyl phthalate (DOP) and ethylene glycol as plasticizers.

Examples 1~6 & Comparative Examples 1~6:
Heat Deterioration Test

DAROCUR 1173 as an ultraviolet curing catalyst was added to the compositions 1~12, followed by radiation of ultraviolet light, to prepare about 2 mm thick sheets, from which were fabricated No. 2 dumbbell specimens. The specimens thus fabricated were then subjected to curing in a circulating hot air dryer at 120° C. and 150° C. for 240 hours. Thereafter, the specimens were measured for percent elongation, the results of which are set out in Table 3.

Examples 7~12 & Comparative Examples 7~12:
Oily Surface Adhesion Test

The compositions 1 to 12 were measured for oily surface bonding force under shear. Specimens were prepared in the following manner. Bonding surfaces of aluminum plates (A2024P)(size: 1.6×25×10 mm) defined by JIS H4000 were polished with sand paper #240 and then washed with toluene. Auto transmission fluid was applied about 0.5 mg/cm$^2$ to one specimen. Then, each of the anaerobic curable compositions 1 to 12 was applied onto the one specimen so as to protrude upon superposition of the other specimen thereon, and the specimens were superposed together 10 mm. Using two clothespins, the superposed surfaces were pinched form both sides. The rate of pulling in the shear bonding force measurement was set at 10 mm/min and the curing time was set at 72 hours. The results obtained are shown in Table 4.

Examples 13~18 & Comparative Examples 13~18:
Oil Dispersibility Test 200 ml of auto transmission fluid was put into a 500 ml glass beaker, into which was then added 0.2 g of each of the compositions 1 to 12, followed by agitation for 3 hours using a handy type agitator (revolutions: 500 rpm, agitating blades: propeller type, diameter: 50 mm). After subsequent filtration using filter paper (500 mesh), a check was made visually to see if there was any residue. The results obtained are shown in Table 5, in which the "○" mark stands for the absence of residue, while the mark "X" stands for the presence of residue.

EFFECT OF THE INVENTION

The anaerobic curable composition of the present invention has flexibility comparable to that of a silicone composition and has a repulsive force high enough to retain flexibility and sealability capable of coping with vibrations and stresses induced in the seal portion between flanges for example. Thus, the follow-up performance of the sealant layer is high. Moreover, even when the composition is used in a high-temperature atmosphere, it is possible to retain an excellent sealability without deterioration of flexibility.

The core-shell fine particles used in the present invention can be easily dispersed as a functional filler in the composition, thus making it possible to simplify the manufacturing process and reducing the manufacturing cost.

Further, since the anaerobic curable sealant composition of the present invention exhibits an oil absorbing action, its oily surface bonding force is superior to that of the conventional flexibility-imparted anaerobic curable composition. More particularly, even if a lubricating oil such as engine oil or auto transmission fluid, or a mold release agent used in molding, or a polishing oil or the like, is adhered to the surface to be sealed such as a flange surface, it is not necessary to perform degreasing and washing with use of a solvent or a detergent. Thus, the manufacturing process can be so much simplified.

Additionally, the anaerobic curable composition before curing according to the present invention, which contains acryl type core-shell fine particles, is dispersed in oil without agglomeration. Therefore, when the composition is used for sealing flange surfaces in an automobile engine or transmission, there is no fear that the portion of the composition protruded to the exterior from the flange surfaces may exert a bad influence on various oils. But the protruded portion will be dispersed uniformly in the oils.

TABLE 1

| Components | Composition | | | | | |
|---|---|---|---|---|---|---|
| | 1 | 2 | 3 | 4 | 5 | 6 |
| polyether-based urethane acrylate prepolymer | 200.0 | 200.0 | 200.0 | | | |
| polyester-based urethane acrylate prepolymer | | | | 200.0 | 200.0 | 200.0 |
| phenoxyethyl acrylate | 50.0 | 50.0 | 50.0 | 50.0 | 50.0 | 50.0 |
| EDTA stabilizer | 0.4 | 0.4 | 0.4 | 0.4 | 0.4 | 0.4 |
| BHT | 0.5 | 0.5 | 0.5 | 0.5 | 0.5 | 0.5 |
| Saccharin | 2.5 | 2.5 | 2.5 | 2.5 | 2.5 | 2.5 |
| benzothiazole | 1.2 | 1.2 | 1.2 | 1.2 | 1.2 | 1.2 |
| n-dodecylmercaptan | 1.0 | 1.0 | 1.0 | 1.0 | 1.0 | 1.0 |
| cumene hydroperoxide | 5.0 | 5.0 | 5.0 | 5.0 | 5.0 | 5.0 |
| silica | 8.0 | 8.0 | 8.0 | 8.0 | 8.0 | 8.0 |
| core-shell rubber (1) | 20.0 | 5.0 | 30.0 | 65.0 | | |
| core-shell rubber (2) | | | | | 30.0 | |
| core-shell rubber (3) | | | | | | 30.0 |

TABLE 2

| Components | Composition | | | | | |
|---|---|---|---|---|---|---|
| | 7 | 8 | 9 | 10 | 11 | 12 |
| polyether-based urethane acrylate prepolymer | 200.0 | 200.0 | 200.0 | 200.0 | | 200.0 |
| epoxy acrylate | | | | | 200.0 | |
| phenoxyethyl acrylate | 50.0 | 50.0 | 50.0 | 50.0 | 50.0 | 50.0 |
| EDTA stabilizer | 0.4 | 0.4 | 0.4 | 0.4 | 0.4 | 0.4 |
| BHT | 0.5 | 0.5 | 0.5 | 0.5 | 0.5 | 0.5 |
| saccharin | 2.5 | 2.5 | 2.5 | 2.5 | 2.5 | 2.5 |
| benzothiazole | 1.2 | 1.2 | 1.2 | 1.2 | 1.2 | 1.2 |
| n-dodecylmercaptan | 1.0 | 1.0 | 1.0 | 1.0 | 1.0 | 1.0 |
| cumen hydroperoxide | 5.0 | 5.0 | 5.0 | 5.0 | 5.0 | 5.0 |
| silica | 8.0 | 8.0 | 8.0 | 8.0 | 8.0 | 8.0 |
| core-shell rubber (1) | | | | | | 30.0 |
| ethylene-acryl rubber | | 20.0 | | | | 20.0 |
| liquid butadiene-acrylonitrile | | | 20.0 | | | |
| DOP | | | | 10.0 | | |
| ethylene glycol | | | | | 30.0 | |

TABLE 3

| Example/ Comparative Example | Composition used | Percent elongation | | |
|---|---|---|---|---|
| | | Initially | after 120° C. heat history | after 150° C. heat history |
| Ex. 1 | composition 1 | 138 | 127 | 110 |
| Ex. 2 | composition 2 | 135 | 119 | 95 |
| Ex. 3 | composition 3 | 141 | 126 | 114 |
| Ex. 4 | composition 4 | 185 | 180 | 165 |
| Ex. 5 | composition 5 | 170 | 160 | 128 |
| Ex. 6 | composition 6 | 153 | 127 | 110 |
| Com.Ex. 1 | composition 7 | 120 | 100 | 75 |
| Com.Ex. 2 | composition 8 | 150 | 142 | 118 |
| Com.Ex. 3 | composition 9 | 156 | 149 | 121 |
| Com.Ex. 4 | composition 10 | 145 | 120 | 93 |
| Com.Ex. 5 | composition 11 | 50 | 15 | 9 |
| Com.Ex. 6 | composition 12 | 190 | 180 | 161 |

TABLE 4

Oily Surface Adhesion Test

| Example/ Comparative Example | Composition used | Shear Bonding Force | |
|---|---|---|---|
| | | oily surface | degreased surface |
| Ex. 7 | Composition 1 | 2.2 | 4.5 |
| Ex. 8 | Composition 2 | 2.6 | 5.1 |
| Ex. 9 | Composition 3 | 2.5 | 4.8 |
| Ex. 10 | Composition 4 | 3.2 | 4.0 |
| Ex. 11 | Composition 5 | 1.7 | 3.2 |
| Ex. 12 | Composition 6 | 1.8 | 3.4 |
| Com.Ex. 7 | Composition 7 | 0.9 | 6.0 |
| Com.Ex. 8 | Composition 8 | 0.8 | 3.2 |
| Com.Ex. 9 | Composition 9 | 0.6 | 3.4 |
| Com.Ex. 10 | Composition 10 | 0.5 | 4.3 |
| Com.Ex. 11 | Composition 11 | 1.8 | 7.6 |
| Com.Ex. 12 | Composition 12 | 0.5 | 2.2 |

TABLE 5

Oil Dispersibility Test

| Example/ Comparative Example | Composition used | Evaluation |
|---|---|---|
| Ex. 13 | Composition 1 | ○ |
| Ex. 14 | Composition 2 | ○ |
| Ex. 15 | Composition 3 | ○ |
| Ex. 16 | Composition 4 | ○ |
| Ex. 17 | Composition 5 | ○ |
| Ex. 18 | Composition 6 | ○ |
| Com.Ex. 13 | Composition 7 | ○ |
| Com.Ex. 14 | Composition 8 | X |
| Com.Ex. 15 | Composition 9 | X |
| Com.Ex. 16 | Composition 10 | ○ |
| Com.Ex. 17 | Composition 11 | ○ |
| Com.Ex. 18 | Composition 12 | X |

Note)
"○" stands for the absence of residue.
"X" stands for the presence of residue.

What is claimed is:

1. An anaerobic curable sealant composition comprising a urethane (meth)acrylate prepolymer, a radical-polymerizable monomer, an organic peroxide, and core-shell fine particles having a core of a rubbery polymer and a shell of a glassy polymer.

2. An anaerobic curable sealant composition as set forth in claim 1, wherein said urthane (meth)acrylate prepolymer is prepared by reacting an isocyanate group-containing urethane prepolymer with an active hydrogen-containing (meth)acryl monomer, said isocyanate group-containing urethane prepolymer being prepared by reacting a polyol compound with a polyisocynate compound at an excess molar ratio of isocyanate groups relative to hydroxyl groups.

3. An anaerobic sealant composition as set forth in claim 1, wherein said radical-polymerizable monomer is a substituted or unsubstituted alkyl (meth)acrylate.

4. An anaerobic curable sealant composition as set forth in claim 1, wherein said rubbery polymer which constitutes the core of said core-shell fine particles has a glass transition point of below −10° C., and said glassy polymer which constitutes the shell of the core-shell fine particles has a glass transition point of above 70° C.

5. An anaerobic curable sealant composition as set forth in claim 4, wherein said rubbery polymer which constitutes said core and said glassy polymer which constitutes said shell each contain a (meth)acrylate monomer as an essential constituent monomer.

6. An anaerobic curable sealant composition as set forth in claim 1, wherein said core-shell fine particles are present in an amount of 0.1 to 80 parts by weight based on the total amount of 100 parts by weight of both said urethane (meth)acrylate prepolymer and said radical-polymerizable monomer.

* * * * *